United States Patent [19]

Gupta et al.

[11] Patent Number: 5,437,331
[45] Date of Patent: Aug. 1, 1995

[54] METHOD FOR FRACTURING SUBTERRANEAN FORMATIONS USING CONTROLLED RELEASE BREAKERS AND COMPOSITIONS USEFUL THEREIN

[75] Inventors: D. V. Satyanarayana Gupta, The Woodlands; Bethicia B. Prasek, Houston, both of Tex.

[73] Assignee: The Western Company of North America, Houston, Tex.

[21] Appl. No.: 295,269

[22] Filed: Aug. 24, 1994

[51] Int. Cl.$^6$ ............................................. E21B 43/26
[52] U.S. Cl. .................................. 166/300; 166/308; 507/902; 507/921
[58] Field of Search ................ 166/300, 308; 507/921, 507/922

[56] References Cited

U.S. PATENT DOCUMENTS

| | | | |
|---|---|---|---|
| 4,506,734 | 3/1985 | Nolte | 166/300 X |
| 4,524,155 | 6/1985 | Walch et al. | 521/64 |
| 4,690,825 | 9/1987 | Won | 424/501 |
| 4,741,401 | 5/1988 | Walles et al. | 166/300 |
| 4,873,091 | 10/1989 | Jankower et al. | 424/489 |
| 4,919,209 | 4/1990 | King | 166/300 |
| 5,102,558 | 4/1992 | McDougall et al. | 252/8.551 |
| 5,106,518 | 4/1992 | Cooney et al. | 252/8.551 |
| 5,110,486 | 5/1992 | Manalastas et al. | 166/308 X |
| 5,164,099 | 11/1992 | Gupta et al. | 252/8.551 |
| 5,184,917 | 2/1993 | Rez | 405/128 |
| 5,201,370 | 4/1993 | Tjon-Joe-Pin | 166/300 |
| 5,224,544 | 7/1993 | Tjon-Joe-Pin et al. | 166/295 |
| 5,247,995 | 9/1993 | Tjoe-Joe-Pin et al. | 166/312 |
| 5,373,901 | 12/1994 | Norman et al. | 166/300 |

FOREIGN PATENT DOCUMENTS

WO91/18521 12/1991 WIPO.
WO91/18974 12/1991 WIPO.

OTHER PUBLICATIONS

1992 SPE Permian Basin Oil and Gas Recovery Conference held in Midland, Tex. Mar. 18–20. "*High–pH–Tolerant Enzyme Breaker for Oilfield Applications*".
Publication Strata Views–Jul. 1993 "*History of the Development of Fracturing Fluid Breakers*".

*Primary Examiner*—George A. Suchfield
*Attorney, Agent, or Firm*—Peter A. Bielinski

[57] ABSTRACT

A method of fracturing a subterranean formation in a well bore is shown in which a gellable fracturing fluid is first formed by blending together an aqueous fluid, a hydratable polymer, a suitable cross-linking agent for cross-linking the hydratable polymer to form a polymer gel and an encapsulated enzyme breaker. The cross-linked polymer gel is pumped into the well bore under sufficient pressure to fracture the surrounding formation. The encapsulated enzyme breaker is allowed to degrade the cross-linked polymer with time to reduce the viscosity of the fluid so that the fluid can be pumped from the formation back to the well surface. The particular enzyme breaker uses open cellular encapsulation to protect and delay the action of the enzyme.

11 Claims, No Drawings

METHOD FOR FRACTURING SUBTERRANEAN FORMATIONS USING CONTROLLED RELEASE BREAKERS AND COMPOSITIONS USEFUL THEREIN

BACKGROUND OF THE INVENTION

1. Field of the Invention

The invention relates to methods for treating subterranean formations. Specifically, the invention is directed to methods of fracturing a subterranean formation utilizing a fracturing composition which includes an encapsulated enzyme breaker.

2. Description of the Prior Art

It is a common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and imposing sufficient pressure on the fracturing fluid to cause the formation to break down with the attendant production of one or more fractures. Usually a gel, an emulsion or a foam, having a proppant such as sand or other particulate material suspended therein is introduced into the fracture. The proppant is deposited in the fracture and functions to hold the fracture open after the pressure is released and the fracturing fluid is withdrawn back into the well. The fracturing fluid has a sufficiently high viscosity to penetrate into the formation to realize fracturing and to retain the proppant in suspension or at least to reduce the tendency of the proppant to settle out of the fracturing fluid. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and the fracturing of the formation has been obtained, it is desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking the gelled or emulsified fracturing fluid has commonly been obtained by adding a "breaker", that is, a viscosity-reducing agent, to the subterranean formation at the desired time. However, this technique can be unreliable and sometimes results in incomplete breaking of the fluid and/or premature breaking of the fluid before the fracturing process is complete. Premature breaking can decrease the number of fractures obtained and thus, the amount of hydrocarbon recovery. Further, it is known in the art that most fracturing fluids will break if given enough time at sufficient temperature and pressure. However, it is, of course, most desirable to return the well back to production as quickly as possible.

It has been suggested that a fracturing fluid is concentrated 5-7 times due to fluid loss during pumping and fracture closure. An unencapsulated breaker dissolves in the fluid and is lost along with the fluid during fluid loss. The dissolved breaker does not concentrate along with the filter cake concentration of the polymer and thus does not effectively break the filter cake. Therefore, permanent damage to the formation occurs.

There have been several proposed methods for the breaking of fracturing fluids which were aimed at eliminating the above problems. For example, U.S. Pat. No. 4,202,795 discloses a method to release a chemical into an aqueous fluid by combining the chemical with a solid hydratable gelling agent and a breaker for the gel formed by the gelling agent when hydrated. The mixture is formed into pills or pellets, preferably having size and range of from about 20 to about 40 mesh. (U.S. Sieve Series) From combining the pellets with an aqueous fluid into which the chemical is to be released, the gelling agent in the pellets hydrates and forms a protective gel around each of the pellets which prevents the release of the chemical into the aqueous fluid for the time period required for the protective gel to be broken by the gel breaker in the pellets. A large amount of hydratable gelling agent is required and the amount of hydratable gelling agent must be monitored closely.

U.S. Pat. No. 4,506,734 provides a viscosity-reducing chemical contained within hollow or porous, crushable and fragile beads. When a fracturing fluid containing such beads passes or leaks off into the formation or the fluid is removed by back flowing, any resulting fractures in the subterranean formation close and crush the beads. The crushing of the beads then releases the viscosity-reducing chemical into the fluid. This process is dependent upon the pressure of the formation to obtain release of the breaker and is thus, subject to varying results dependent upon the formation and its closure rate.

U.S. Pat. No. 4,741,401 discloses a method for breaking a fracturing fluid comprised of injecting into the subterranean formation a capsule comprising an enclosure member containing the breaker. The breaker is released from the capsule by pressure generated within the enclosure member due solely to the fluid penetrating into the capsule whereby the increased pressure causes the capsule to rupture, releasing the breaker. This method for release of the breaker would result in the release of the total amount of breaker contained in the capsule at one particular point in time. The patent examples disclose the use of the encapsulated breaker at temperatures ranging from room temperature, 65° C. to 85° C.

In another method to release a breaker, U.S. Pat. No. 4,770,796 teaches or suggests an acid fracturing fluid composition comprising a polymer, a crosslinking agent for said polymer, an aqueous acid and a breaker compound capable of coordinating with titanium or zirconium crosslinking agent. The breaker compound is encapsulated in a composition comprising a cellulosic material and a fatty acid and optionally a wax.

Further, U.S. Pat. No. 4,919,209 discloses a method for breaking a gelled oil fracturing fluid for treating a subterranean formation which comprises injecting into the formation a breaker capsule comprising an enclosure member enveloping a breaker. The enclosure member is capable of dissolving or eroding off upon sufficient exposure to the fluid, thereby releasing the breaker.

The typical breakers that are used in fracturing fluids are enzymes and oxidizers. Unfortunately, at temperatures below 150° F., persulfates, the typical oxidizing breakers, are not effective unless used in large concentrations or used with catalysts.

Several enzymes are known to break the structure of polysaccharides or their derivatives. A great advantage of enzymes is cleanliness and effectiveness at lower temperatures. A small quantity of enzyme is capable of breaking gel quickly at mild conditions while a much larger concentration of conventional oxidizer would be required to achieve equal results. Conventional enzymes can be applied only when the fluid temperature will not exceed 150° F. and when the fluid pH is in the range of 3.5 to 11. Exposure of these enzymes to higher temperatures or higher pH quickly deactivates them and usually results in a permanent enzyme degradation.

There remains a need for a method for the controlled breaking of fracturing fluids which is economical and provides controlled release of the breaker, reduces damage to the formation and facilitates well clean-up. In addition, there remains a need for a controlled release enzyme breaker which may be used in environments which would ordinarily quickly degrade the enzyme.

SUMMARY OF THE INVENTION

The invention relates to a method for treating a subterranean formation. Specifically, the invention is directed to a method of fracturing a subterranean formation utilizing an aqueous-based fracturing fluid and controllably breaking said fluid with an encapsulated enzyme breaker. The present invention is also directed to a composition for fracturing a subterranean formation which includes the utilization of an encapsulated enzyme breaker. The present invention is further directed to an encapsulated enzyme breaker for controllably breaking aqueous-based fracturing fluids.

Controlled release encapsulated enzyme can be used to control the break of low temperature fracturing and gravel packing gels used in the oil and gas wells. The technology of open cellular encapsulation for controlled release is preferred and is based on a non membrane encapsulation process. The technology involves creating a matrix of pores containing the active ingredient and controlling the release based on diffusion or the expansion of the pores at given temperatures to release the active ingredients. In the present invention, any breaker which can perform as a gel breaker can be used including oxidizers and enzymes. In a preferred embodiment, enzymes used to break galactomannan (e.g., guar and derivatized guar) and cellulosics in particular and natural polymers in general, can be trapped in open microcellular systems. Their release is controlled by the design of the pore size of the matrix. This material can be used in the same manner as prior art delayed or encapsulated breakers are used for minimizing formation damage without premature loss of the viscosity of stimulation fluids. The proper choice of particle size distribution can also be used to minimize gel filter cake damage. The encapsulated enzymes of the present invention are shear stable which means that they can go through typical oil field pumps and equipment without premature release of enzyme. Unlike systems which release by a rupture mechanism, or a diffusion mechanism, these systems can have zero release at time zero, if properly designed and their release rates can depend only on temperature.

The encapsulated enzyme breaker of the invention is comprised of a breaker enclosed within an inert open cell microporous matrix which is permeable to the enzyme breaker such that upon sufficient contact with fracturing fluid or a fluid in the formation the enzyme breaker is controllably released over time by diffusion through the matrix into the fracturing fluid. The matrix stays intact throughout the period of the release of the enzyme breaker, thus providing controlled release.

In one embodiment of the present invention there is provided a means of slowly releasing amounts of enzyme breaker over time instead of a single release of the total amount of enzyme breaker from all capsules at a given time. The present invention also provides an encapsulated enzyme breaker which is capable of functioning in an aqueous-based fluid at low temperatures, from about 40° F. to about 200° F., without premature release of the enzyme breaker into the fracturing fluid. In addition, it has been found that encapsulated breakers of the present invention are capable of functioning at temperatures well above the temperatures at which the enzyme is normally deactivated. Further, the present invention provides increased well clean-up due to the fact that the encapsulation vehicle stays intact, i.e., it does not degrade, dissolve, erode or rupture, thus maintaining the integrity of the medium and the enzyme. The encapsulated enzyme breaker of the present invention provides these benefits due to the fact that the enzyme breaker is held within a network of pores in the delivery vehicle and subsequently diffuses in a controlled manner through the pores into the formation being treated with the fracturing fluid. In addition, the delivery vehicle which has partially released the enzyme breaker becomes entrapped within the filter cake formed by the gelled/emulsified fracturing fluid upon water leak-off into the formation. Even after load water recovery, the vehicle continues to release the enzyme breaker which breaks the gel/emulsion residue in the filter cake and hence results in decreased formation damage.

DETAILED DESCRIPTION OF THE INVENTION

The method of the present invention is directed to the fracturing of subterranean formations with aqueous-based fracturing fluids which are known in the art. For example, the method of the present invention is directed to fracturing subterranean formations using aqueous-based fracturing fluids containing polymers such as guar, hydroxy alkyl guar, carboxyl alkyl hydroxy guar, cellulose, hydroxy alkyl cellulose, carboxyl alkyl hydroxy alkyl cellulose, xanthan and the like. The present invention is also directed to fracturing fluids which are crosslinked. For example, fracturing fluids which are crosslinked with known crosslinkers such as borate, titanate, and zirconate. Specifically, the method of the present invention is directed to injecting a fracturing fluid into a subterranean formation as disclosed above, fracturing the formation, and controllably breaking the fracturing fluid by utilizing the encapsulated breaker of the invention.

Generally, the encapsulated enzyme breaker of the present invention can be added to any fracturing fluid generally known in the art. In the practice of the present invention, the encapsulated enzyme breaker can be injected with the fracturing fluid. Further, the encapsulated enzyme breaker of the present invention can be added to a carrier fluid and then injected into the subterranean formation subsequent to, simultaneous with, or prior to the injection of the fracturing fluid. Encapsulated enzyme breakers are often added with the fracturing fluid. The various fluids used to fracture formations and their compositions are well known in the art and essentially contain a carrier fluid, usually an aqueous liquid, and a viscosifying polymer. Fracturing fluids usually also contain one or more of the following: surfactants, salts, anti-foaming agents, and polymer thickeners.

In the instant invention, a delivery vehicle comprised of a polymeric particle or bead having a network of pores with the enzyme held protectively within the network is utilized to provide a controlled time release of the enzyme. The enzyme may be released by temperature, pressure, diffusion or volatilization. Thus, the delivery vehicle is uniquely suited for use in oilfield applications in which it is desirable to release a breaker by one or more of such methods.

A delivery vehicle according to the present invention has increased mechanical stability over previous microencapsulated or gel delivery vehicles. The network of pores of a particle according to the present invention will not be subject to osmotic shock which might occur in prior art delivery vehicles. In addition, the increased mechanical stability allows a delivery vehicle to be manufactured, processed and handled under more severe conditions, such as mechanical pumping, which might otherwise rupture or damage prior art gel or microencapsulated delivery vehicles. Thus, encapsulated enzymes according to the present invention can easily be incorporated in certain media in which it would prove difficult or more expensive to incorporate delivery vehicles of the prior art.

When an encapsulated enzyme is prepared in accordance with the present invention, the enzyme is trapped in the network of pores during polymerization of the particle or bead or by absorbing or adsorbing the enzyme into or onto the surface of the bead including the pores. The enzyme of the present invention should have a substantially uniform concentration throughout the network of pores. This uniformity helps to create a more controlled time release of the enzyme from the network of pores over a given period of time.

Suitable polymeric particles will not readily undergo unwanted reactions, will be stable over a wide pH range, and will resist moderate oxidation and reduction. The particles should be stable at higher temperatures, resist attack by moisture, and have a relatively long shelf life.

The beads or particle of the present invention may be rigid or resilient. The particles and methods of preparing such particles are described in U.S. Pat. Nos. 4,873,901, 4,690,825 and 4,806,360 which are hereby incorporated by reference.

The preferred polymer particle matrix of the present invention comprises rigid or resilient polymeric beads having a substantially non-collapsible pore structure. That is, the beads will substantially retain their internal pore structure even after the porogen (used in formation of the bead as described hereinafter) has been extracted and the pores are empty. Such beads are mechanically stable allowing manufacturing, processing, and handling of the beads under relatively rigorous conditions which might result in the rupture or damage of less stable materials. More importantly, the non-collapsible pores facilitate introduction of the enzyme solution as described in more detail hereinafter.

The polymeric beads of the present invention are formed by polymerization and cross-linking of one or more preselected monomers to form a molecular structure having a substantially non-collapsible network of pores resulting from the presence of the porogen during polymerization. At least one monomer will be polyethylenically unsaturated, and usually the polymer will include a monoethylenically unsaturated co-monomer. The degree of cross-linking may then be controlled by adjusting the ratio of monoethylenically unsaturated monomer to polyethylenically unsaturated monomer, as discussed in more detail hereinbelow.

The beads of the polymer are conveniently formed by suspension polymerization in a liquid-liquid system. In general, a solution containing monomers, a polymerization catalyst (if used), and an inert but fully miscible liquid porogen is formed which is immiscible with water. The solution is then suspended in an aqueous solution, which generally contains additives such as surfactants and dispersants to promote the suspension. Once the suspension is established with discrete droplets of the desired size, polymerization is effected (typically by activating the reactants by either increased temperature or irradiation). Once polymerization is complete, the resulting rigid beads are recovered from the suspension. The beads at this point are solid porous structures, the polymer having formed around the inert, water-immiscible liquid, thereby forming the pore network. The liquid porogen has accordingly served as a "pore-forming agent" and occupies the pores of the formed beads.

Suitable porogens include a wide range of substances, notably inert, non-polar organic solvents. Some of the most convenient examples are alkanes, cycloalkanes, and aromatics. Extraction of the porogen may be effected by solvent extraction, evaporation, or similar conventional operations. The porogen extraction step accomplishes the removal of unwanted species from the polymerized structures prior to impregnation with the desired gel breaker substance. Such unwanted species include unreacted monomers, residual catalysts, and surface active agents and/or dispersants remaining on the bead surfaces.

Once the beads are rendered dry and free of the porogen and any unwanted organic materials, the breaker, e.g. enzyme, is introduced to the internal pore networks of the individual beads by using an enzyme solution or dispersion in a suitable solvent.

The polymerization process used in preparing the beads of the polymer delivery system can be modified to control both the porosity and the particle diameter of the beads. Particle diameter is controlled primarily by the degree of agitation, with more rigorous agitation causing smaller droplets and hence smaller polymerized beads. The pore diameter and pore volume, in contrast, are controlled primarily by the cross-linking density. Porosity is increased by increasing the amount of cross-linking monomer used, or by increasing the porogen concentration in the monomer mixture, or both. An increase in porosity increases the surface area of the bead and hence the weight percent of the enzyme which may be held within the bead. Bead diameter is also affected by the concentration of dispersing agent in the immiscible phase.

The bead diameter in the polymer delivery system should be in the range from about 5 to 100 microns. Beads having an average diameter in the range from about 5 microns to no more than about 70 microns are preferred, with a bead diameter in the range from about 10 microns to about 40 microns being particularly preferred.

The pore dimensions within the beads may vary widely, with optimum dimensions depending on the chemical characteristics of the polymers used as well as the diffusive characteristics of the particular enzyme/solvent used. In general, best results are obtained with total pore volumes ranging from about 0.1 to about 2.0 cc/g, preferably from about 0.3 to about 1.0 cc/g; pore surface areas ranging from about 1 to about 500 $m^2/g$, preferably from about 20 to about 200 $m^2/g$; and average pore diameters ranging from about 0.001 to about 3.0 microns, preferably from about 0.003 to about 1.0 micron.

In order to form the crosslinked polymer beads of the present invention, it is necessary to polymerize either polyethylenically unsaturated monomers, i.e., those having at least two sites of unsaturation, or to polymerize monoethylenically unsaturated monomers in the presence of one or more polyethylenically unsaturated monomers. In the latter case, the percentage of crosslinking may be controlled by balancing the relative amounts of monoethylenically unsaturated monomer and polyethylenically unsaturated monomer. Preferably the crosslinking density should be at least about ten percent, more preferably between about twenty percent and about eighty percent.

Monoethylenically unsaturated monomers suitable for preparing polymer beads for the polymer delivery system include ethylene, propylene, isobutylene, diisobutylene, styrene, ethyvinylbenzene, vinyltoluene, and dicyclopentadiene; esters of acrylic and methacrylic acid, including the methyl, ethyl, propyl, isopropyl, butyl, sec-butyl, tert-butyl, amyl, hexyl, octyl, ethylhexyl, decyl, dedecyl, cyclohexyl, isobornyl, phenyl, benzyl, alkylphenyl, ethoxymenthyl, ethoxyethyl, ethoxypropyl, propoxymethyl, propoxyethyl, propoxpropyl, ethoxphenyl, ethoxybenzyl, and ethoxycyclohexyl esters; vinyl esters, including vinyl acetate, vinyl propionate, vinyl butyrate and vinyl latrate; vinyl ketones, including vinyl methyl ketone, vinyl ethyl detone, vinyl isopropyl ketone, and methyl isopropenyl ketone; vinyl ethers, including vinyl methyl ether, vinyl ethyl ether, vinyl propyl ether, and vinyl isobutyl ether; and the like.

Polyethylenically unsaturated monomers which ordinarily act as though they have only one unsaturated group, such as isopropene, butadiene and chloroprene, may be used as part of the monoethylenically unsaturated monomer content.

Polyethylenically unsaturated crosslinking monomers suitable for preparing such polymer beads include diallyl phthalate, ethylene glycol diacrylate, ethylene glycol dimethacrylate, trimethylolpropanetrimethacrylate, divinylsulfone; polyvinyl and polyally ethers of ethylene glycol, of glycerol, of pentaerythritol, of diethyleneglycol, of monothio- and dithioderivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarbollylate, triallyl aconitate, triallyl citrate, triallyl phosphate, divinyl naphthalene, divinylbenzene, trivinylbenzene; alkyldivinylbenzenes having from 1 to 4 alkyl groups of 1 to 2 carbon atoms substituted on the benzene nucleus; trivinylnaphthalenes, and polyvinylanthracenes.

The particularly preferred polymeric encapsulation medium of the present invention is formed by the copolymerization of methylmethacrylate and ethylene glycol dimethylmethacrylate. Usually, the methylmethacrylate will be present at from about 10 to 80 percent of the monomer mixture, more usually at about 20 to 60 percent of the monomer mixture, typically being in the range from about 45 to 55 percent of the monomer mixture, with the ethylene glycol dimethylmethacrylate forming the remainder of the mixture.

Enzymes useful in the present invention include any enzyme which would benefit from being encapsulated e.g. enzymes which must survive a harsh environment before enzymatic action is needed or enzymes whose activity must be delayed or available over an extended period of time.

Examples of enzymes which are useful include cellulase, hemicellulase, amylase, carbohydrate hydrolase, galactomannan hydrolase, etc.

Specific commercial enzymes useful in the present invention include; GAMMANASE 1.5L ®" enzyme, a galactomannanase available from Novo Nordisk of Norway, "HEMICELLULASE B1500 ®" enzyme a hemicellulase available from Solvay Enzymes, Elkhart, Ind., "HEMICELL ®" enzyme a hemicellulase enzyme available from ChemGen Corporation, Gaithersburg, Md., and "TENASE/200 ®" enzyme or "CLARASE 40000 ®" enzyme both alpha amylases available from Miles Laboratories Inc.

The enzymes may be introduced to the polymeric particle pore matrix by absorption of a solution or dispersion of enzyme in a suitable carrier or vehicle or by trapping the enzyme in a network of pores during polymerization of the particle.

Enzymes may also be introduced to the polymeric particles of the present invention by absorption of a dispersion of finely divided enzyme particles together with solubilized enzyme in a suitable carrier vehicle into the particles. Any particles should have a particle size in the range from about 0.01 to 0.1 microns. If the particles are any larger, they should be reduced in size to within the stated range. The larger particles will generally not be dispersed and absorbed into the pores of the polymeric particles.

The enzyme is dissolved or dispersed in a suitable carrier or vehicle, such as water buffer, alkali, or other suitable solvent. The solution or dispersion is then absorbed within the polymeric particles by contact absorption, followed by drying to evaporate the carrier or vehicle. Amounts of enzyme in the range from about 3 to 6 weight percent of the final composition may be introduced in a single absorption step. The weight concentrations of the enzyme as high as 30 to 40 weight percent may be achieved by multiple absorption steps.

The following examples are offered by way of illustration, not by way of limitation.

EXAMPLES

Preparation of Polymer Beads

The polymer beads used in the following examples were polymethylmethacrylate copolymer beads and were prepared by the method described below.

Preparation of Polymethylmethacrylate (PMMA) Copolymer Beads from Methylmethacrylate and Ethyleneglycol Dimethacrylate.

A two-liter four-necked raction flask equipped with a stirrer driven by a variable speed motor, reflux condenser, thermometer, and nitrogen-inlet tube was set up. A slow flow of nitrogen was maintained through the reaction flask at all times. An aqueous phase made up of 450 parts of deionized water, 4 parts of gum arabic, and 4 parts of sodium lignosulfate was added to the flask, and an organic solution made up 52 parts of methylmethacrylate, 78 parts ethyleneglycol dimethacrylate, 1.5 parts of benzoyl peroxide (70% in water), and 150 parts of toluene was dispersed in the aqueous phase with rapid stirring (stirrer speed approximately 900 rpm) to obtain a plurality of droplets having an average droplet size of below about 60 microns, as determined by visual observation of a sample of the droplets being stabilized by the dispersants.

The reaction mixture was heated to 65° C. for 1 hour, then to 75° C. and allowed to remain at this temperature for approximately 7 hours while maintaining a nitrogen flow of 2 ml/minute to form porous beads of crosslinked methacrylate/ethyleneglycoldimethacrylate copolymer having toluene entrapped within the pores. The reaction mixture was then cooled and the beads collected by filtration, washed three times with 1000 parts of deionized water, and three times with 1000 parts of acetone, then dried in a vacuum oven at 80° C. for about 24 hours.

The calculation of theoretical crosslink density of the purified beads was 60%, calculated by dividing the weight of ethyleneglycoldimethacrylate (78 g) by the weight of monomer (130 g).

The surface area of a sample was 180.59 m²/g and the pore volume was 0.684 ml/g, determined as described above.

Preparation of Encapsulated Breaker

The polymer beads as described above were then used to prepare encapsulated enzyme breakers.

In each of the following examples the compositions used were as follows: "BUFFER 5L TM" high pH buffer (approx. 10.0) is available from The Western Company of North America; "BUFFER 6L TM" buffer high pH buffer (approx. 12.0) is available from The Western Company of North America; "CL-30 TM" borate crosslinker slurried in diesel oil is available from The Western Company of North America; "J-4L SLURRIED POLYMER CONCENTRATE TM" concentrated liquid guar base polymer gelling agent is available from The Western Company of North America; "J-20 TM" hydroxypropylguar gelling agent is available from The Western Company of North America; "CLAY TREAT 2C TM" KCl substitute is available from The Western Company of North America; "GELMASTER TM" gel stabilizer is available from The Western Company of North America; "HEMICELL ®" liquid hemicellulase enzyme is available from ChemGen Corporation; acrylate copolymer beads and styrene copolymer beads are available from Advanced Polymer Systems, Redwood City, Calif.

The controlled release breakers of the present invention were made using the open microcellular entrapment technique. The entrapping polymer used was the polymethylmethacrylate as described above.

The controlled release enzyme breakers for the Examples were prepared as follows: 5 or 15 grams of "HEMICELL ®" liquid hemicellulase enzyme aqueous solution having an activity of 64 BU/lb. was added to about 5 grams of polymethylmethacrylate micro porous polymer particles dropwise over a period of about 20 minutes with frequent stirring to evenly disperse the enzyme in the polymer particles. The resulting polymer particles containing the enzyme solution were a free flowing "dry" powder. The particles were then placed in a small vacuum dessicator containing no dessicant and placed under vacuum for about 5 hours.

Entrapping polymer used, method of drying, weight percent polymer, form, and activity of the breaker are shown in Table I.

TABLE 1

| Controlled Release Enzyme Sample | Method of Drying | Sample Compositions Entrapping Polymer | Initial wt. % polymer | Form | Theoretical/ Calculated Activity |
|---|---|---|---|---|---|
| #1 | vacuum dried | acrylate copolymer | 50 | dry powder | 44.6 BU/lb. |
| #2 | vacuum dried | acrylate copolymer | 25 | dry powder | 77.8 BU/lb. |
| #3 | not dried | acrylate copolymer | 50 | dry powder | 32 BU/lb. |
| Neat Enzyme Solution Control | not dried | N/A | none | enzyme solution | 64 BU/lb. |

The following test results illustrate the controlled release property of the preferred embodiment of the present invention.

EXAMPLE 1

A fluid was prepared by hydration of 40 pounds of "J-20 TM" gellant per 1000 gallons in water. This fluid was mixed with "BUFFER 5L TM" buffer to produce a base fluid having a pH in the range from 9 to 10. Thereafter neat enzyme or controlled release enzyme sample #1 according to the invention were added to 200 ml aliquots of the buffered base fluid and the viscosity of the aliquot was measured, using a Fann 35 A viscometer at 511 sec⁻¹, as a function of time and temperature as indicated in Tables 2, 3 and 4.

TABLE 2

Viscosity Versus Time For a 40 Pound Per Thousand Gallon "J-20 ™" Gel at 80° F.

| Time (Hours) | Viscosity (cP) with One Pound of Sample #1 Per Thousand Gallons of Gel | Viscosity (cP) with 0.5 Pounds Per Thousand of of Neat Enzyme Per Thousand Gallons of Gel |
| --- | --- | --- |
| 0 | 32.5 | 32.5 |
| 0.5 | 31.0 | 19.9 |
| 1 | 29.2 | 17.2 |
| 2 | 23.3 | 13.2 |
| 3.5 | 19.4 | 10.1 |
| 6 | 15.2 | 7.9 |
| 24 | 9.5 | 4.5 |

TABLE 3

Viscosity Versus Time For a 40 Pound Per Thousand Gallon "J-20 ™" Gel at 100° F.

| Time (Hours) | Viscosity (cP) with One Pound of Sample #1 Per Thousand Gallons of Gel | Viscosity (cP) with 0.5 Pounds Per Thousand of of Neat Enzyme Per Thousand Gallons of Gel |
| --- | --- | --- |
| 0 | 32.5 | 32.5 |
| 1.25 | 26.6 | 11.0 |
| 2.25 | 22.9 | 8.7 |
| 4 | 18.4 | |
| 5.5 | 16.9 | |
| 6.5 | 16.5 | |

TABLE 4

Viscosity Versus Time For a 40 Pound Per Thousand Gallon "J-20 ™" Gel at 120° F.

| Time (Hours) | Viscosity (cP) with One Pound of Sample #1 Per Thousand Gallons of Gel | Viscosity (cP) with 0.5 Pounds Per Thousand of of Neat Enzyme Per Thousand Gallons of Gel |
| --- | --- | --- |
| 0 | 32.5 | 32.5 |
| 1 | 23.9 | 8.0 |
| 2 | 21.6 | 5.5 |
| 3.5 | 16.7 | |
| 5 | 15.7 | |

The above data illustrate that the compositions of the present invention produce a delayed or controlled viscosity degradation of the gel relative to the neat enzyme product at 80° F., 100° F. and 120° F.

EXAMPLE 2

The data outlined in Tables 5 and 6 illustrate the high temperature activity of the preferred embodiment of the present invention. The viscosity of the fluids was measured using a Fann 50 C viscometer.

The fluid used in the following examples was prepared as follows: 40 pounds "J-4L ™" gellant per thousand gallons of tap water, 2% w potassium chloride, 10 pounds "GELMASTER ™" gel stabilizer per thousand gallons and 2 gallons of "BUFFER 6L ™" buffer per thousand gallons. The fluid was crosslinked with 1.25 gallons of "CL-30 ™" crosslinker per thousand gallons. Controlled release enzyme sample #3, when used, was added at room temperature.

TABLE 5

Viscosity Versus Time Without Breaker at 250° F.

| Time (minutes) | Viscosity (cP) at 100 sec$^{-1}$ |
| --- | --- |
| 2 | 725 |
| 61 | 540 |
| 121 | 570 |
| 181 | 600 |
| 241 | 547 |
| 301 | 556 |
| 361 | 557 |
| 421 | 561 |
| 481 | 527 |
| 601 | 512 |
| 721 | 473 |
| 901 | 419 |

TABLE 6

Viscosity Versus Time Using 20 Pounds of Sample #3 Per Thousand Gallons of Fluid At 250° F.

| Time (minutes) | Viscosity (cP) at 100 sec$^{-1}$ |
| --- | --- |
| 2 | 838 |
| 61 | 707 |
| 121 | 572 |
| 181 | 475 |
| 241 | 432 |
| 301 | 375 |
| 361 | 322 |
| 421 | 268 |
| 481 | 213 |
| 601 | 203 |
| 721 | 147 |
| 841 | 145 |
| 901 | 115 |
| 961 | 106 |

When neat enzyme was added at 250° F., the viscosity of the gel degraded prematurely, leaving insufficient initial viscosity. The above examples illustrate that controlled release enzymes according to this invention provide an extended useful temperature range for the enzyme.

Although the foregoing invention has been described in some detail by way of illustration and example for purposes of clarity of understanding, it will be obvious that certain changes and modifications may be practiced within the scope of the appended claims.

What is claimed is:

1. A method for fracturing a subterranean formation which comprises introducing into said formation at a flow rate and pressure sufficient to produce a fracture in said formation, a fluid comprised of an aqueous gel and a delayed gel breaker wherein said gel breaker comprises polymer particles each defining a network of internal pores and having a breaker entrapped within said network of pores, wherein said particles are polymers having a cross-linking density of at least about 10% and said breaker has been introduced to said pores by absorption or by entrapment of the breaker during polymerization of the particle.

2. The method of claim 1 wherein said polymer particles have a substantially noncollapsible pore structure.

3. The method of claim 1 wherein the polymer particles are selected from the group consisting of styrene-divinylbenzene copolymer particles and polymethylmethacrylate particles.

4. The method of claim 1, wherein said crosslinking density is in the range from about 20% to 80%.

5. The method of claim 1, wherein said particles have an average diameter in the range from about 5 μm to 100 μm.

6. The method of claim 1, wherein said particles have an average diameter in the range from about 10 μm to 40 μm.

7. The method of claim 1, wherein said internal pores have an average diameter of from about 0.001 to about 3.0 microns.

8. The method of claim 1, wherein the breaker is selected from the group consisting of oxidizers and enzymes.

9. The method of claim 8, wherein the enzyme is selected from the group consisting of cellulase, hemicellulase and amylase.

10. The method of claim 1, wherein the breaker is introduced into said particles by absorption of a solution or dispersion of breaker in a suitable carrier, followed by evaporation of the carrier.

11. The method of claim 10, wherein the carrier is selected from the group consisting of water, buffer, and alkaline solution.

* * * * *